(12) United States Patent
Jacobs et al.

(10) Patent No.: US 9,066,394 B2
(45) Date of Patent: Jun. 23, 2015

(54) METHOD AND APPARATUS PROVIDING DEEP DIMMING OF SOLID STATE LIGHTING SYSTEMS

(75) Inventors: Joseph Hendrik Anna Maria Jacobs, Eygelshoven (NL); Michael Datta, Brookline, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 362 days.

(21) Appl. No.: 13/496,947

(22) PCT Filed: Sep. 1, 2010

(86) PCT No.: PCT/IB2010/053929
§ 371 (c)(1),
(2), (4) Date: Apr. 10, 2012

(87) PCT Pub. No.: WO2011/036588
PCT Pub. Date: Mar. 31, 2011

(65) Prior Publication Data
US 2012/0181944 A1    Jul. 19, 2012

Related U.S. Application Data

(60) Provisional application No. 61/246,328, filed on Sep. 28, 2009.

(51) Int. Cl.
*H05B 33/08* (2006.01)

(52) U.S. Cl.
CPC ........ *H05B 33/0815* (2013.01); *H05B 33/0845* (2013.01); *Y02B 20/346* (2013.01); *Y02B 20/383* (2013.01)

(58) Field of Classification Search
CPC ............ H05B 39/00; H05B 37/02; H02J 1/00
USPC .................................. 315/297, 307; 307/166
See application file for complete search history.

(56) References Cited

U.S. PATENT DOCUMENTS

| | | | | |
|---|---|---|---|---|
| 4,321,509 A | * | 3/1982 | Miyaji et al. | 315/291 |
| 6,040,660 A | * | 3/2000 | Schmidt et al. | 315/200 A |

(Continued)

FOREIGN PATENT DOCUMENTS

| | | |
|---|---|---|
| JP | 57113585 A | 7/1982 |
| JP | 200735403 A | 2/2007 |

(Continued)

OTHER PUBLICATIONS

Rand, D et al. "Issues, Models and Solutions for Triac Modulated Phase Dimming of LED Lamps". Power Electronics Specialists Conference, 2007, PESC 2007, IEEE, Orlando, Florida.

(Continued)

*Primary Examiner* — Don Le
(74) *Attorney, Agent, or Firm* — Yuliya Mathis (57) ABSTRACT

Disclosed are devices and related methods for optimally extending the range of light output of solid-state light sources, particularly at minimum light levels, through a power converter that includes a phase detector, a processing unit and a switch. The phase detector is configured to receive a voltage signal and to detect rising edges of waveforms of the voltage signal. The processing unit is configured to initiate a predetermined shutdown period in response to each detected rising edge. The switch is configured to provide a control signal that deactivates the power converter during the shutdown period, preventing the power converter from providing power to the solid state light unit during the shutdown period.

20 Claims, 4 Drawing Sheets

(56) References Cited

U.S. PATENT DOCUMENTS

| | | | |
|---|---|---|---|
| 6,274,987 B1* | 8/2001 | Burke | 315/307 |
| 7,294,978 B1* | 11/2007 | Shuy | 315/291 |
| 7,525,293 B1* | 4/2009 | Notohamiprodjo et al. | 323/235 |
| 2002/0171376 A1* | 11/2002 | Rust et al. | 315/276 |
| 2004/0135523 A1 | 7/2004 | Takahashi et al. | |
| 2007/0182347 A1* | 8/2007 | Shteynberg et al. | 315/312 |
| 2008/0067950 A1* | 3/2008 | Yu et al. | 315/276 |
| 2009/0160369 A1 | 6/2009 | Godbole et al. | |
| 2009/0196072 A1* | 8/2009 | Ye | 363/17 |
| 2010/0156319 A1* | 6/2010 | Melanson | 315/297 |

FOREIGN PATENT DOCUMENTS

| | | |
|---|---|---|
| WO | 2005115058 A1 | 12/2005 |
| WO | 2008029108 A1 | 3/2008 |
| WO | 2008112735 A2 | 9/2008 |

OTHER PUBLICATIONS

Joep Jacobs et al; "Deep Dimming of SSL Lamps", Philips Internal, Nov. 13, 2008, pp. 1-9.

* cited by examiner

METHOD AND APPARATUS PROVIDING DEEP DIMMING OF SOLID STATE LIGHTING SYSTEMS

TECHNICAL FIELD

The present invention is directed generally to control of dimmers for solid state lighting fixtures. More particularly, various inventive methods and apparatuses disclosed herein relate to extending the range of light output of solid state lighting systems, particularly at minimum light levels.

BACKGROUND

Digital or solid state lighting technologies, i.e., illumination based on semiconductor light sources, such as light-emitting diodes (LEDs) and organic light-emitting diodes (OLEDs), offer a viable alternative to traditional fluorescent, high-intensity discharge (HID), and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing white light and/or different colors of light, e.g., red, green and blue, as well as a controller or processor for independently controlling the output of the LEDs in order to generate a variety of colors and color-changing lighting effects, for example, as discussed in detail in U.S. Pat. Nos. 6,016,038, 6,211,626, and 7,014,336 incorporated herein by reference.

Many lighting applications make use of dimmers. While conventional dimmers work well with incandescent lamps, problems often occur when these dimmers are used with other types of electronic lamps, including compact fluorescent lamp (CR), low voltage halogen lamps using electronic transformers and solid state lighting (SSL) lamps, such as LEDs and OLEDs. Low voltage halogen lamps using electronic transformers, in particular, may be dimmed using special dimmers, such as electric low voltage (ELV) type dimmers or resistive-capacitive (RC) dimmers, which work adequately with loads that have a power factor correction (PFC) circuit at the input.

Dimmers typically have an electronic switch. When the switch is closed, (turned on), a voltage is applied to the output and when the switch is open (turned off), no voltage is applied to the output. Different types of electronic switches may be used in conventional dimmers. For example, triacs may be used, which require a minimum current to stay on. This is the so-called holding current. Low-wattage lamps, such as LED lamps, often fail to draw this minimum current at low dim levels, causing the triac to switch incorrectly causing flicker. Other dimmers use metal-oxide semiconductor field-effect transistors (MOSFETs) or insulated gate bipolar transistors (IGBTs) as the electronic switch. These switches have no minimum current requirement, and thus LED lamps typically work better with these non-triac based dimmers.

Conventional dimmers typically chop a portion of each waveform of the mains voltage signal and pass the remainder of the waveform to the lighting fixture. A leading edge or forward-phase dimmer chops the leading edge of the voltage signal waveform. A trailing edge or reverse-phase dimmer chops the trailing edge of the voltage signal waveform. Electronic loads, such as LED drivers, typically operate better with trailing edge dimmers.

Conventional dimmers have fixed minimum, relatively high RMS output voltages, which limit the minimum light level that can be achieved. Additionally, dimmers may affect the maximum light output, where the maximum light output using a dimmer is lower than the maximum light output without the dimmer. For example, using a typical conventional dimmer, an LED current only can be varied between about 20 percent and about 90 percent of the total current without a dimmer, depending on the dimmer and the lamp. For some conventional lamps, the minimum light level may be as high as 30 percent. There is demand for minimum light levels in the range of 5 percent or lower, as well as for maxim light levels closer to 100 percent.

SUMMARY

The present disclosure generally relates to inventive methods and devices for optimally extending the range of light output of solid-state light sources, particularly at minimum light levels, referred to "deep dimming."

Generally, in one aspect, a device is provided for enabling deep dimming of a solid state lighting unit through a power converter. The device includes a phase detector, a processing unit and a switch. The phase detector is configured to receive a voltage signal and to detect rising edges of waveforms of the voltage signal. The processing unit is configured to initiate a predetermined shutdown period in response to each detected rising edge. The switch is configured to provide a control signal that deactivates the power converter during the shutdown period, preventing the power converter from providing power to the solid state light unit during the shutdown period.

In another aspect, a method implemented by a timing and control circuit is provided for enabling deep dimming of a solid state lighting unit through a power converter. The method includes receiving a rectified voltage signal; detecting rising edges of waveforms of the rectified voltage signal; and deactivating the power converter for a predetermined shutdown period in response to detecting each detected rising edge to prevent the power converter from providing power to the solid state light fixture during the shutdown period.

In another aspect, a computer readable medium for storing a program, executable by a computer processor is provided for enabling deep dimming of a solid state lighting unit through a power converter. The computer readable medium includes a detecting code segment for detecting rising edges of waveforms of a received rectified voltage signal, and a deactivating code segment for deactivating the power converter for a predetermined shutdown period in response to each detected rising edge, preventing the power converter from providing power to the solid state light unit during the shutdown period.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., LED white lighting fixture) may include a number of dies which respectively emit different spectra of electroluminescence that, in combination, mix to form essentially white light. In another implementation, an LED white light fixture may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white light LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor and/or controller may be associated with one or more storage media (generically referred to herein as "memory," e.g., volatile and non-volatile computer memory such as random-access memory (RAM), read-only memory (ROM), programmable read-only memory (PROM), electrically programmable read-only memory (EPROM), electrically erasable and programmable read only memory (EEPROM), universal serial bus (USB) drive, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same or similar parts throughout the different views. Also, the drawings are not necessarily to scale, emphasis instead generally being placed upon illustrating the principles of the invention.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope and spirit of the present disclosure.

Figure 1:
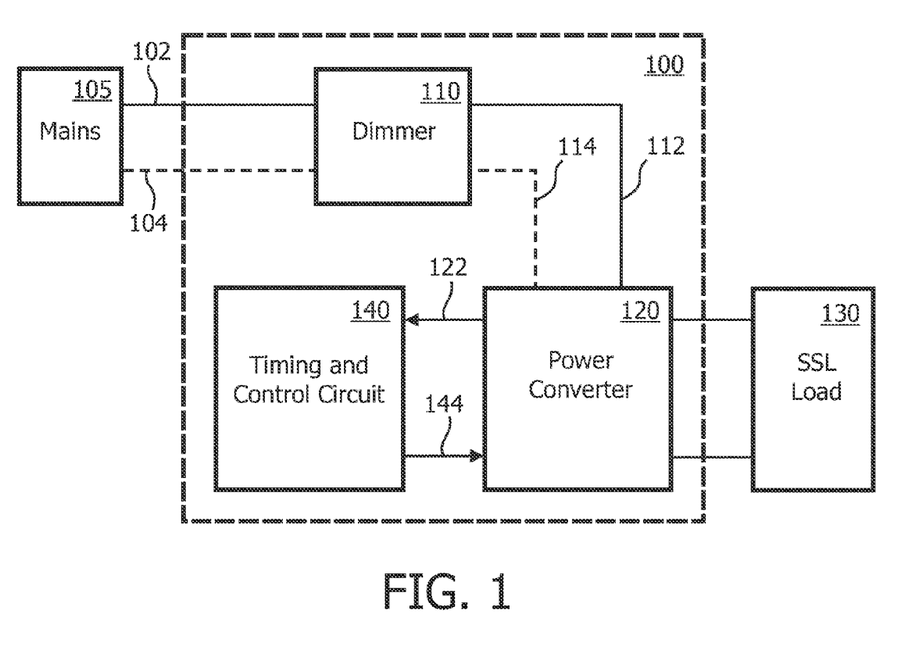
FIG. 1 is a block diagram showing a dimmer controlled solid state lighting system, according to a representative embodiment.

FIG. 1 is a block diagram showing a dimmer-controlled, solid-state lighting system, according to a representative embodiment. Referring to FIG. 1, a dimmer system 100 includes a dimmer 110, a power converter 120 and a timing and control circuit 140. The dimmer system 100 receives unrectified voltage from mains 105, and powers SSL load 130 based on a setting of dimmer 110. The dimmer system 100 may be a two- or three-wire electronic low-voltage (ELV) dimmer, for example, such as Lutron Diva DVELV-300 dimmer, available from Lutron Electronics Co., Inc. The SSL load 130 may be an LED or OLED lighting unit or lighting system, for example. The various components shown in FIG. 1 may be arranged in different pre-packaged configurations that may differ from the depicted grouping. For example, the power converter 120, the timing and control circuit 140 and the SSL load 130 may be packaged together in one product, such as one of LED-based lighting fixtures of Essential-White™ series, available from Philips Color Kinetics (Burlington, Mass.). Various embodiments may include any type of the dimmer, lighting system and/or packaging, without departing from the scope of the present invention.

The dimmer 110 receives unrectified voltage from a power source, indicated by mains 105, through hot line 102 and neutral line 104. Generally, the unrectified voltage is an AC line voltage signal having a voltage value, e.g., between about 90VAC and about 277VAC, and corresponding substantially sinusoidal waveforms. The dimmer 110 includes an adjuster (not shown), which enables the dimming level to be variably selected, e.g., manually by a user or automatically by a processor or other setting selection system. In an embodiment, the adjuster enables settings ranging from about zero to 100 percent of the maximum light level of the SSL load 130 (i.e., if operated without a dimmer). Also, in various embodiments, the dimmer 110 is a phase chopping (or phase cutting) dimmer, which chops either the leading edges or trailing edges of the input voltage waveforms, thereby reducing the amount of power reaching the SSL load 130. For purposes of explanation, it is assumed the dimmer 110 is a trailing edge dimmer, which cuts a variable amount of the trailing edges of the unrectified sinusoidal waveforms, as shown for example in trace (1) of FIG. 2, where the vertical axis indicates AC voltage, the horizontal axis indicates time and $T_N$ is the period of each waveform.

Figure 2:
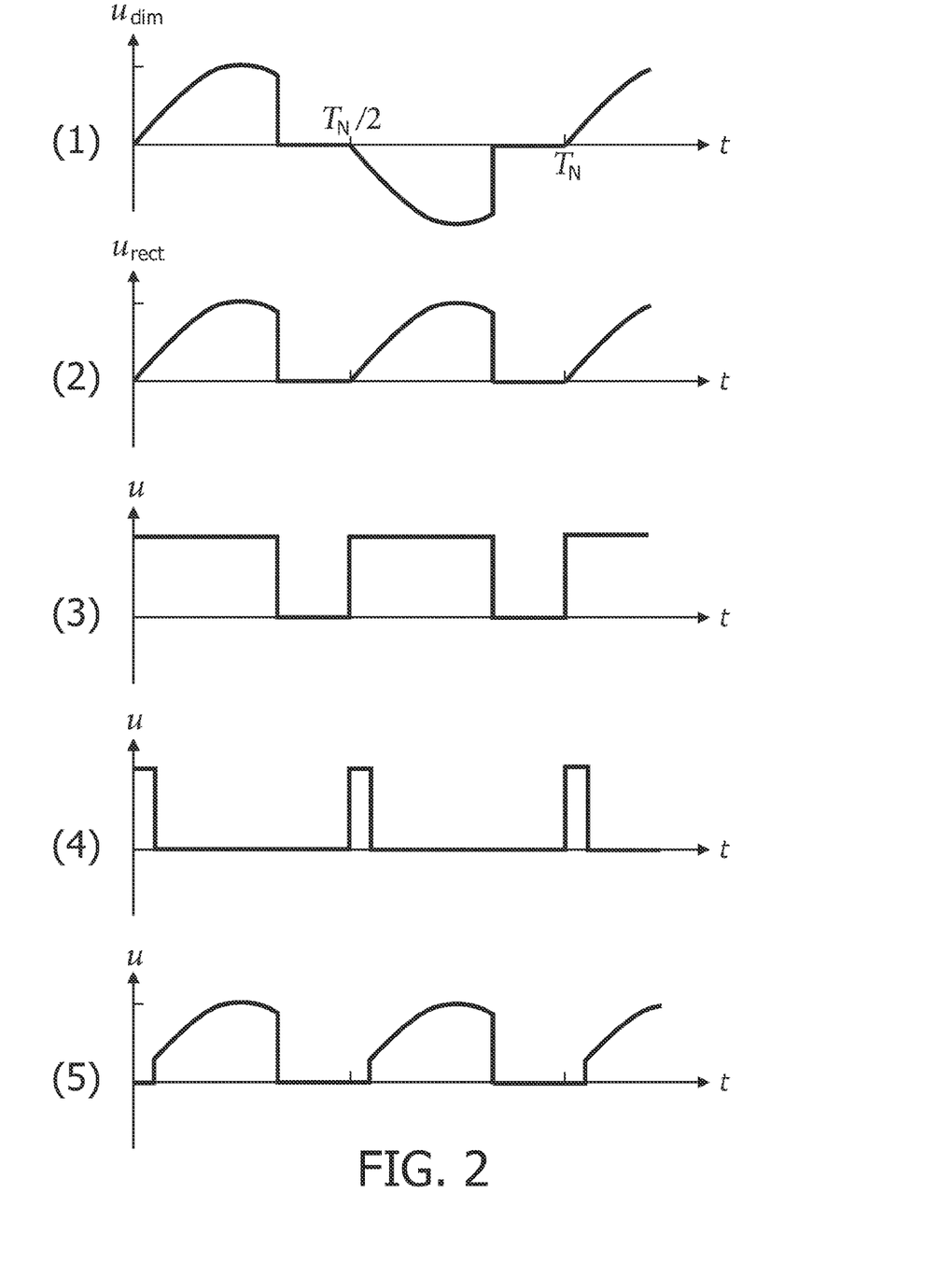
FIG. 2 shows sample traces of waveforms of signals of the dimmer controlled solid state lighting system, according to a representative embodiment.

The dimmer 110 provides the dimmed unrectified voltage (e.g., having chopped waveforms) to the power converter 120 though dimmed hot line 112 and neutral line 114. The power converter 120 may include structure and functionality described, for example, in U.S. Pat. No. 7,256,554, to Lys, issued Aug. 14, 2007, the subject matter of which is hereby incorporated by reference. The power converter 120 includes a voltage rectifier for rectifying the unrectified voltage signal and a shutdown switch, e.g., responsive a high input signal for stopping power conversion. Trace (2) of FIG. 2 shows an example of the dimmed AC rectified voltage signal (e.g., having chopped waveforms).

The power converter 120 may be constructed of any combination of hardware, firmware or software architectures, without departing from the scope of the present teachings. For example, in various embodiments, the power converter 120 may implemented as a microprocessor, ASIC, FPGA, and/or microcontroller, such as an L6562 PFC controller, available from ST Microelectronics. When using the L6562 PFC controller, the shutdown switch may be provided at the zero cross detector (ZCD) pin or the multiplier (MULT) pin, for example.

Generally, during the on-time of the dimmer 110 (the time during which the rectified voltage signal is above zero), the power converter 120 transfers current responsive to the rectified voltage signal to the SSL load 130. Thus, the shortest dimmer on-time is what normally determines the minimum light output. In various embodiments, the current transfer is initially suppressed (e.g., for about 1.0 ms to about 2.5 ms) during each on-time period of the dimmer 110. This may be accomplished by temporarily turning off or deactivating the power controller 120 during the initial suppression time, referred to as the shutdown period. Without the deep dimming circuit of the various embodiments, the ideal current follows the dimmer output voltage. With the deep dimming circuit, the current input to the SSL load 130 stays zero during the shutdown period. When the dimmer 110 is set high (lightly chopped waveform), the average current input to the SSL load 130 does not change appreciably as a result of the shutdown period. When the dimmer 110 is set low (heavily chopped waveform), the average current effectively goes to zero.

More particularly, in an embodiment, the timing and control circuit 140 receives the dimmed rectified voltage on input line 122 from the power converter 120, and outputs a power control signal on control line 144 to the power converter 120. The power control signal shuts down or otherwise temporarily deactivates the power converter 120, thus preventing the power converter 120 from providing power to the SSL load 130 for the predetermined shutdown period, enabling the SSL load 130 to operate at very low dimmed values. In various embodiments, the shutdown period may be about 1.0 ms to about 2.5 ms, for example, although the shutdown period may vary to provide unique benefits for any particular situation or to meet application specific design requirements of various implementations, as would be apparent to one skilled in the art.

For example, referring to FIG. 2, the timing and control circuit 140 converts the dimmed AC rectified voltage shown by trace (2) to a corresponding DC voltage signal (having a maximum value of about 5 VDC, for example), as shown by trace (3). The timing and control circuit 140 then converts the DC voltage signal shown by trace (3) to a power control timing signal, as shown by trace (4) of FIG. 2, where the time period of each pulse is equivalent to the shutdown period. Accordingly, because the power converter 120 is shut down or deactivated during the shut down period, the resulting dimmed AC rectified voltage, on which control of the SSL load 130 is based, has a small chopped portion occurring at the leading edges of the sinusoidal wave forms, as shown for example by trace (5) of FIG. 2. Accordingly, the power converter 120 is controlled to provide less power to the SSL load 130.

General functionality of the timing and control circuit 140 is discussed with reference to FIG. 3, which is a flow diagram showing a process of controlling a dimmer controlled solid state lighting system, according to a representative embodiment.

Figure 3:
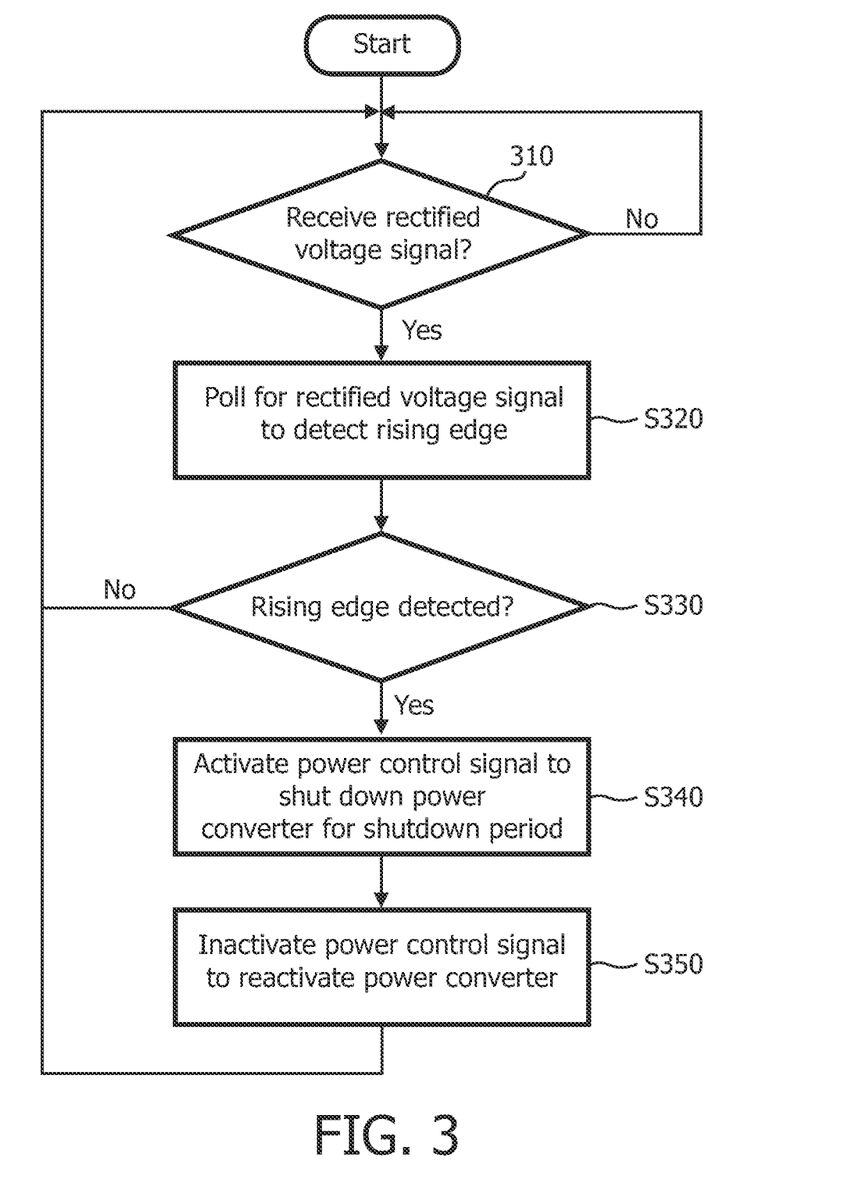
FIG. 3 is a flow diagram showing a process of controlling a dimmer controlled solid state lighting system, according to a representative embodiment.

Referring to FIG. 3, the timing and control circuit 140 determines whether a rectified voltage signal has been received, e.g., from the power converter 120 via input line 122, at step S310. The rectified voltage signal is based on the unrectified voltage signal output by the dimmer 110, and indicates the desired level of diming of the SSL load 130 through chopped sinusoidal waveforms. When no rectified voltage signal is received (S310: No), the process returns to the beginning to continue checking. When a rectified voltage signal is received (S310: Yes), the rectified voltage signal is polled at step S320 to detect a rising edge of the waveform. For example, the rising edge may be detected by determining a "zero crossing" of the rectified voltage signal, discussed below, which is the time at which the rectified voltage signal departs from a voltage level of zero, indicating the start of the rising edge.

In an embodiment, a further step (not shown) may be performed to determine whether a received rectified voltage is actually a dimmed rectified voltage (e.g., having a trailing edge chopped waveform), or an undimmed rectified voltage (e.g., having a complete sinusoidal waveform), before beginning the rising edge detection process. Thus, the shutdown period would be implemented only in the case of a dimmed rectified voltage signals. Also, in an embodiment, the detection of the rising edges of the waveforms may be performed on an unrectified voltage signal (i.e., before the rectifier), without departing from the scope of the present teachings.

At step S330, it is determined whether the rising edge of the rectified voltage signal has been detected. When it has not been detected (S330: No), the process returns to step S310 to continue monitoring received rectified voltage signals. When the rising edge has been detected (S330: Yes), the power control signal is activated to shut down or deactivate the power converter 120 for the predetermined shutdown period at step S340. At step S350, after the shutdown period has elapsed, the power control signal is deactivated, thus turning on or reactivating the power converter 210. In an embodiment, the power control signal may transition between a high voltage level (e.g., 5VDC), which lasts the shutdown period, and a low voltage level (e.g., 0VDC), as shown in trace (4) of FIG. 2. As discussed above, when the power converted 120 is implemented using the L6562 PFC controller, for example, power control signal may be input at the ZCD pin, which causes the L6562 PFC controller to "turn off" in response to a high voltage level and to "turn on" in response to a low voltage level. More particularly, the high voltage level signal actually activates a transistor, which pulls the ZCD pin low to shut down the L6562 PFC controller, as discussed below with reference to FIG. 5.

Figure 4:
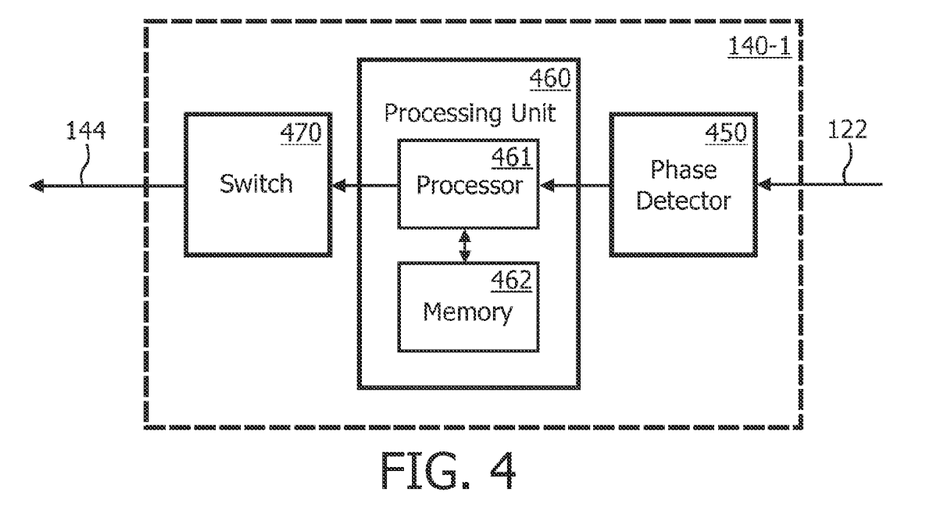
FIG. 4 is a block diagram showing a timing and control circuit of the dimmer controlled solid state lighting system of FIG. 1, according to a representative embodiment.

FIG. 4 is a block diagram showing a timing and control circuit of the dimmer controlled solid state lighting system of FIG. 1, according to a representative embodiment. Referring to FIG. 4, the timing and control circuit 140-1 in the depicted representative embodiment includes a phase detector 450, a processing unit 460 and a switch 470. The phase detector 450 receives and determines the phase of the AC rectified voltage signal, e.g., from the power converter 120, in order to identify the rising edges of the rectified voltage signal waveforms. For example, as discussed above, the phase detector 450 may determine the "zero crossing" of the rectified voltage signal, which indicates the time at which a waveform of the rectified voltage signal departs from zero.

The processing unit 460 receives an indication when the rising edge of a rectified voltage signal waveform has been detected, and in response, controls the switch 470 to output the appropriate level (e.g., high level) of the power control signal for the predetermined shutdown period to the power converter 120. In an embodiment, the processing unit may include processor 461 and memory 462. The processor 461 is configured to execute one or more logical or mathematical algorithms, including enabling deep dimming of solid state lighting fixtures (e.g., SSL load 130) through a power control signal of the embodiments described herein, in conjunction with the memory 462, as well as basic functionality for executing and/or controlling the SSL load 130. The processor 461 may be constructed of any combination of hardware, firmware or software architectures, and include its own memory (e.g., nonvolatile memory) for storing executable software/firmware executable code that allows it to perform the various functions. Alternatively, the executable code may be stored in designated memory locations within memory 462, discussed below. In an embodiment, the processor 421 may be a central processing unit (CPU), for example, executing an operating system, such as Windows operating systems available from Microsoft Corporation, NetWare operating system available from Novell, Inc., or Unix operating system available from Sun Microsystems, Inc. The operating system may also control execution of other programs of the timing and control circuit 140-1, as well as the dimmer 110 and the power converter 120.

The memory 462 may be any number, type and combination of nonvolatile read only memory (ROM) and volatile random access memory (RAM), and stores various types of information, such as signals and/or computer programs and software algorithms executable by the processor 461 (and/or other components), e.g., to control dimming power of the SSL load 130, as well as the basic functionality of the dimmer system 100. The memory 462 may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like. Further, the memory 462 may store the predetermined shut down periods corresponding to various types of dimmer 110, power converter 120 and/or SSL load 130, as discussed above.

The various "parts" shown in the timing and control circuit 140-1 may be physically implemented using a software-controlled microprocessor, e.g., processor 461, hard-wired logic circuits, firmware, or a combination thereof. Also, while the parts are functionally segregated in the timing and control circuit 140-1 for explanation purposes, they may be combined variously in any physical implementation.

Figure 5:
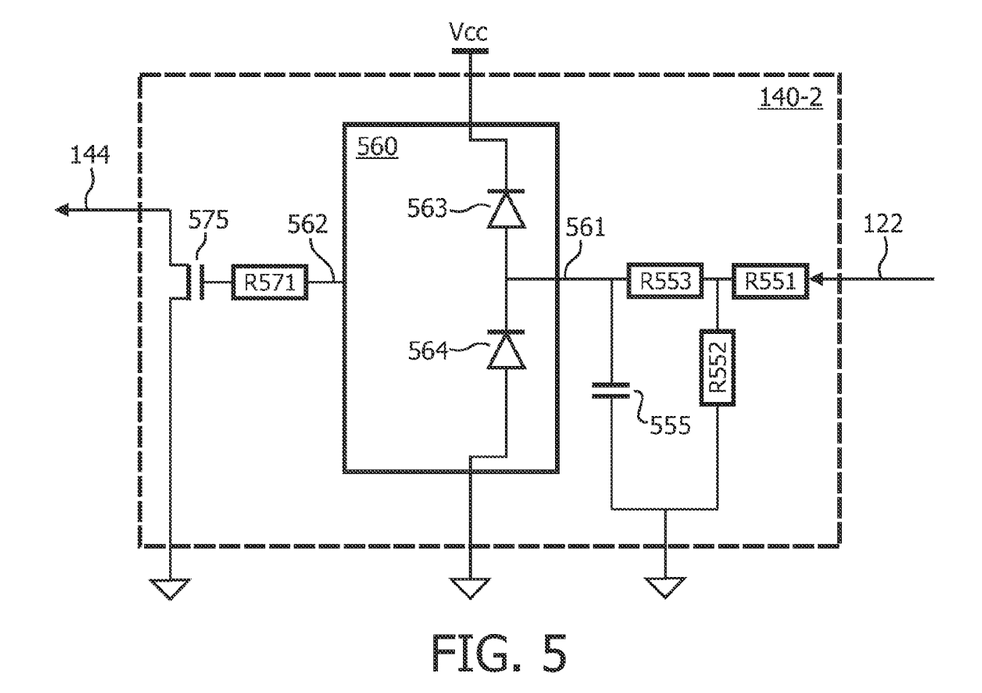
FIG. 5 is a circuit diagram showing a timing and control circuit of the dimmer controlled solid state lighting system of FIG. 1, according to a representative embodiment.

FIG. 5 is a circuit diagram showing a timing and control circuit of the dimmer controlled solid state lighting system of FIG. 1, according to a representative embodiment. Referring to FIG. 5, the functionality of the timing and control circuit 140-2 is implemented, in part, by microcontroller 560, such as a PIC10F200, PIC10F220 or PIC10F222, for example, available from Microchip Technology, Inc. In the depicted implementation, the microcontroller 560 has multiple input/output (I/O) pins or nodes, including a digital input node 561 enabling detection of the rising edge of the rectified voltage signals and a digital output node 562 for triggering the shutdown switch of the power converter 120 during the shutdown period, e.g., at the beginning of the rising edge of each waveform of the rectified voltage signal, as discussed above.

More particularly, the representative timing and control circuit 140-2 receives the rectified voltage signal from the power convertor 120 via input line 122. A phase (rising edge) detector circuit of the timing and control circuit 140-2 includes an ohmic divider consisting of resistors R551 and R552 for reducing voltage, high value resistor R553 for limiting current, and low value capacitor 555 for minimizing disturbances. The resistors R551 and R552 may each have a value of about 750Ω, the resistor R553 may have a value of about 4.7 MΩ, and the capacitor 555 may have a value of about 10 pF, for example, although the specific may vary to provide unique benefits for any particular situation or to meet application specific design requirements of various implementations, as would be apparent to one skilled in the art.

The phase detector circuit further includes internal circuitry of the microcontroller 560, including diodes 563 and 564 (which may be internal protection diodes of the microcontroller 560, for example). The diodes 563 and 564 are connected between voltage source Vcc and ground. In the configuration depicted in FIG. 5, the diodes 563 and 564 quickly become saturated in response to the rising edge of the rectified voltage signal, providing an apparent digital signal that substantially corresponds to non-zero voltage levels (voltage pulses) of the rectified voltage signal waveforms, an example illustration of which is shown by trace 3 of FIG. 2. Generally, the beginning or rising edge of a waveform in trailing edge dimmer, for example, is detected using the configuration of FIG. 5 with a delay of only about 100 µs.

The output node 562 of the microcontroller 560 is controlled (e.g., by an internal processor of the microcontroller 560) to output a high voltage level for a predetermined time corresponding to the shutdown period in response to detection of each rising edge of the rectified voltage signal, and otherwise to output a low voltage level. An example illustration of the voltage levels at the output node 562 is shown by trace 4 of FIG. 2. In the embodiment, the digital output node 562 is connected to a gate of transistor 575 through resistor R571, such that the transistor 575 is turned on during the shutdown period, thus triggering the shutdown switch of the power converter 120 through control line 144. For example, when the power converter 120 is implemented using an L6562 PFC controller, the transistor 575 may be configured to pull the ZCD pin or the MULT pin of the L6562 PFC controller low when turned on, thus deactivating the power converter 120. Of course, various embodiments may include configurations in which the transistor 575 is turned off during the shutdown period, causing the power converter 120 to be deactivated, without departing from the scope of the present teachings.

In an embodiment, the transistor 575 may be a MOSFET and the resistor R571 may have a value of about 200Ω, for example. Further, the transistor 575 may have a first source/drain connected to the control line 144 and a second source/drain connected to ground. As configured, the transistor 575 is turned on in response to a first voltage level (e.g., a high voltage level) received from the output node 562, and turned off in response to a second voltage level (e.g., a low voltage level) received from the output node 562.

Once the shutdown period elapses, the output node 562 is set to output a low level, shutting off the transistor 575 and thus reactivating the power converter 120. As a result, the rectified voltage according to which the power converter 120 controls the SSL load 130 has a chopped leading edge corresponding to the shutdown period, in addition to the chopped trailing edge corresponding to the desired amount of dimming set by the dimmer 110, as shown, for example, by trace (5) of FIG. 2. In this manner, deep dimming, including dimming from about 90 percent down to about zero percent of full lighting capability, may be achieved.

As stated above, the functionality of the timing and control circuit 140 of FIG. 1 may be implemented without using a microcontroller, for example, using ASICs, FPGAs, and the like. For example, in an embodiment where the timing and control circuit 140 includes standard gates and comparators, a first comparator compares a (ohmic divided) rectified voltage, received via input line 122, with a value which is ideally zero. A first output voltage of the first comparator is input to an AND gate, used to create a high ohmic input. The output voltage of the AND gate is fed into a delay circuit, which delays the rising edge of the output voltage of the AND gate, but not the falling edge. A second comparator compares the output voltage of the delay circuit with a constant reference voltage, and provides a second output voltage. Small capacitors (e.g., 68 pF) may be added between inverting inputs of each of the first and second comparators and ground to obtain more stable operation and reduce disturbances, and pull-up resistors (e.g., 15 kΩ) may be included used at the comparator outputs.

The first and second output voltages from the first and second comparators, respectively, are fed to an XOR gate, the output of which is connected to the control line 144 to selectively deactivate the power controller 120 for the shutdown period, enabling deep dimming of the SSL Load 130. In the embodiment, the output of the XOR gate may be connected to a gate of a MOSFET, for example, through a resistor, such that the MOSFET is turned on during the shutdown period, thus triggering the shutdown switch of the power converter 120 through the control line 144. For example, when the power converter 120 is implemented using an L6562 PFC controller, the MOSFET may be configured to pull the ZCD pin or the MULT pin of the L6562 PFC controller low when turned on, thus deactivating the power converter 120.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Any reference numerals or other characters, appearing between parentheses in the claims, are provided merely for convenience and are not intended to limit the claims in any way.

What is claimed is:

1. A device for enabling deep dimming of a solid state lighting unit through a power converter configured to receive a voltage signal, the device comprising:
    a phase detector configured to receive the voltage signal and to provide a digital signal corresponding to a waveform of the voltage signal, the digital signal indicating rising edges of the waveform of the voltage signal;
    a processing unit configured to provide a power control timing signal in response to the digital signal for initiating a predetermined shutdown period in response to each rising edge; and
    a switch configured to provide a control signal that deactivates the power converter during the shutdown period in response to the power control timing signal, preventing the power converter from providing power to the solid state light unit during the shutdown period.

2. The device of claim 1, wherein the shutdown period is in a range of approximately 1.0 ms to approximately 2.5 ms.

3. The device of claim 1, wherein the voltage signal comprises a rectified voltage signal received by the phase detector from the power converter, the rectified voltage signal having chopped waveforms indicating a selected amount of dimming.

4. The device of claim 3, wherein the chopped waveforms comprise trailing edge chopped waveforms.

5. The device of claim 3, wherein the chopped waveforms comprise leading edge chopped waveforms.

6. The device of claim 1, wherein the processing unit initiates the shutdown period during a beginning portion of each waveform.

7. The device of claim 1, wherein the phase detector comprises:
    a first diode connected between an input node and a high voltage source; and
    a second diode connected between the input node and ground,
    wherein the first and second diodes become saturated in response to the phase detector receiving the rising edges of the waveform of the rectified voltage signal, providing the digital signal.

8. The device of claim 7, wherein the phase detector further comprises:
    an ohmic divider configured to reduce a voltage level of the rectified voltage signal; and
    a resistor configured to reduce current to the input node.

9. The device of claim 1, wherein the switch comprises a transistor having a gate connected to an output of the processor, a first source/drain connected to a shutdown switch of the power converter and a second source/drain connected to ground.

10. The device of claim 9, wherein the gate of the transistor receives a first voltage level signal from the processor during the shutdown period, the first voltage level signal turning on the transistor and deactivating the power converter via the shutdown switch.

11. A method implemented by a timing and control circuit for enabling deep dimming of a solid state lighting unit through a power converter configured to receive and rectify a voltage signal from a dimmer, the method comprising:

receiving the rectified voltage signal;

providing a digital signal corresponding to a waveform of the rectified voltage signal, the digital signal indicating rising edges of the waveform of the rectified voltage signal; and deactivating the power converter for a predetermined shutdown period in response to each rising edge to prevent the power converter from providing power to the solid state light unit during the shutdown period.

12. The method of claim 11, wherein the shutdown period is in a range of approximately 1.0 ms to approximately 2.5 ms.

13. The method of claim 11, wherein the rectified voltage signal comprises chopped waveforms indicating a selected amount of dimming.

14. The method of claim 13, wherein the chopped waveforms comprise trailing edge chopped waveforms.

15. The method of claim 13, wherein the chopped waveforms comprise leading edge chopped waveforms.

16. The method of claim 11, wherein deactivating the power converter for the predetermined shutdown period occurs during a beginning portion of each waveform.

17. The method of claim 11, wherein detecting rising edges of waveforms of the rectified voltage signal comprises saturating at least one diode in response to receiving the rising edges of the waveforms of the rectified voltage signal.

18. A non-transitory computer readable medium for storing a program, executable by a computer processor, for enabling deep dimming of a solid state lighting unit through a power converter configured to receive and rectify a voltage signal, the computer readable medium comprising:

a detecting code segment for providing a digital signal corresponding to a waveform of the rectified voltage signal and for detecting rising edges of the waveform based on the digital signal; and a deactivating code segment for providing a power control signal to deactivate the power converter for a predetermined shutdown period in response to each detected rising edge, preventing the power converter from providing power to the solid state light unit during the shutdown period.

19. The computer readable medium of claim 18, wherein the rectified voltage signal comprises chopped waveforms indicating a selected amount of dimming.

20. The computer readable medium of claim 19, wherein the power converter is deactivated for the predetermined shutdown period during a beginning portion of each waveform.

* * * * *